United States Patent
Lee

(10) Patent No.: US 7,400,619 B2
(45) Date of Patent: Jul. 15, 2008

(54) METHOD FOR SUB-PORT MULTICASTING IN AN ATM SWITCHING SYSTEM

(75) Inventor: Jong Ick Lee, Seoul (KR)

(73) Assignee: LG Nortel Co., Ltd., Seoul (KR)

( * ) Notice: Subject to any disclaimer, the term of this patent is extended or adjusted under 35 U.S.C. 154(b) by 1058 days.

(21) Appl. No.: 10/154,595

(22) Filed: May 28, 2002

(65) Prior Publication Data

US 2003/0021276 A1    Jan. 30, 2003

(30) Foreign Application Priority Data

Jul. 30, 2001    (KR) .............................. 2001-45902

(51) Int. Cl.
*H04L 12/28*    (2006.01)

(52) U.S. Cl. ...................... 370/389; 370/399

(58) Field of Classification Search ................ 370/389, 370/390, 400, 392, 395.1, 396, 397, 398, 370/399, 395.3, 395.31

See application file for complete search history.

(56) References Cited

U.S. PATENT DOCUMENTS 5,903,564 A * 5/1999 Ganmukhi et al. .......... 370/399
5,991,297 A * 11/1999 Palnati et al. ............... 370/389

* cited by examiner

*Primary Examiner*—Robert W Wilson
(74) *Attorney, Agent, or Firm*—Ked & Associates, LLP

(57) ABSTRACT

A method for sub-port multicasting in an Asynchronous Transfer Mode (ATM) switching system, including inserting multicast fan-out port information for sub-ports of each of a plurality of switch ports into a multicast cell at an ingress port card, transmitting the multicast cell to an egress port card, reading the multicast fan-out port information from the multicast cell at the egress port card, and performing multicasting for the sub-ports corresponding to the multicast fan-out port information.

23 Claims, 9 Drawing Sheets

Fig.3
(Related Art)

| Byte # | Bits | | | | | | | | |
|---|---|---|---|---|---|---|---|---|---|
| | 7 | 6 | 5 | 4 | 3 | 2 | 1 | 0 | |
| 0 | PortBitMap[47:40] | | | | | | | | Cell Local Header |
| 1 | EBP[4] or Cong | EBP[3:2] or VCLP | | EBP[1:0] | | | TrClass | | |
| 2 | QNR | | | | | Reserved | | | |
| 3 | PortBitMap[39:32] | | | | | | | | |
| 4 | PortBitMap[31:24] | | | | | | | | |
| 5 | PortBitMap[23:16] | | | | | | | | |
| 6 | PortBitMap[15:8] | | | | | | | | |
| 7 | PortBitMap[7:0] | | | | | | | | |
| 8 | CLI | Connection_id[19:16] | | | | BCID | | Test | |
| 9 | CapCode | | | | Ingress_Subport | | | | |
| 10 | GFC/VPI[11:8] | | | | VPI[7:4] | | | | Cell Header |
| 11 | VPI[3:0] | | | | VPI[15:12] | | | | |
| 12 | VCI[11:4] | | | | | | | | |
| 13 | VCI[3:0] | | | | PTI | | | CLP | |
| 14 | HEC | | | | | | | | |
| 15 | Connection_id[15:8] | | | | | | | | Cell Local Header |
| 16 | Connection_id[7:0] | | | | | | | | |
| 17-64 | PayLoad(bytes 1 to 48) | | | | | | | | PayLoad |
| 65 | BIP(resulted from byte 0 to byte 4m, where, m=0...15) | | | | | | | | Parity Check Information |
| 66 | BIP(resulted from byte 1 to byte 4m+1, where, m=0...15) | | | | | | | | |
| 67 | BIP(resulted from byte 2 to byte 4m+2, where, m=0...15) | | | | | | | | |
| 68 | BIP(resulted from byte 3 to byte 4m+3, where, m=0...15) | | | | | | | | |
| 69-72 | Reserved | | | | | | | | |

Fig.4
(Related Art)

| | Connection_id | | QNR | | | | PBM[31:24] | PBM[23:16] | PBM[15:8] | PBM[7:0] |
|---|---|---|---|---|---|---|---|---|---|---|

| 0 | 1 | 2 |
|---|---|---|

Fig. 7

| | 0 | 1 | 2 | 3 | 4 | 5 | 6 |
|---|---|---|---|---|---|---|---|
| Connection_id | QNR | Reserved | PBM[7:0] | SBM[3...0] | | | |
| | | | | SBM[4...7] | | | |
| | | | | SBM[8...11] | | | |
| | | | | SBM[12...15] | | | |
| | | | | SBM[16...19] | | | |
| | | | PBM[15:8] | ⋮ | | | |
| | | | PBM[23:16] | ⋮ | | | |
| | | | PBM[31:24] | SBM[96...99] | | | |
| | | | | SBM[100...103] | | | |
| | | | | SBM[104...107] | | | |
| | | | | SBM[108...111] | | | |
| | | | | SBM[112...115] | | | |
| | | | | SBM[116...119] | | | |
| | | | | SBM[120...123] | | | |
| | | | | SBM[124...127] | | | |

Fig.8

| Byte # | Bits | | | | | | | | |
|---|---|---|---|---|---|---|---|---|---|
| | 7 | 6 | 5 | 4 | 3 | 2 | 1 | 0 | |
| 0 | Reserved | | | | | | | | Cell Local Header |
| 1 | EBP[4] or Cong | EBP[3:2] or VCLP | | EBP[1:0] | | | TrClass | | |
| 2 | QNR | | | | | | Reserved | | |
| 3 | Reserved | | | | | | | | |
| 4 | PortBitMap[31:24] | | | | | | | | |
| 5 | PortBitMap[23:16] | | | | | | | | |
| 6 | PortBitMap[15:8] | | | | | | | | |
| 7 | PortBitMap[7:0] | | | | | | | | |
| 8 | CLI | Connection_id[19:16] | | | | BCID | | Test | |
| 9 | CapCode | | | | Ingress_Subport | | | | |
| 10 | GFC/VPI[11:8] | | | | VPI[7:4] | | | | Cell Header |
| 11 | VPI[3:0] | | | | VPI[15:12] | | | | |
| 12 | VCI[11:4] | | | | | | | | |
| 13 | VCI[3:0] | | | | PTI | | | CLP | |
| 14 | HEC | | | | | | | | |
| 15 | Connection_id[15:8] | | | | | | | | Cell Local Header |
| 16 | Connection_id[7:0] | | | | | | | | |
| 17–64 | PayLoad(bytes 1 to 48) | | | | | | | | PayLoad |
| 65 | SubportBitMap[0:7] | | | | | | | | Fan-Out Subport Information |
| 66 | SubportBitMap[8:15] | | | | | | | | |
| ⋮ | ⋮ | | | | ⋮ | | | | |
| 80 | SubportBitMap[120:127] | | | | | | | | |
| 81–84 | BIPs | | | | | | | | |

METHOD FOR SUB-PORT MULTICASTING IN AN ATM SWITCHING SYSTEM

BACKGROUND OF THE INVENTION

1. Field of the Invention

The present invention relates to sub-port multicasting in an Asynchronous Transfer Mode (ATM) switching system and, in particular, to multicasting by extracting the sub-port fan-out information inserted in the local header of cells.

2. Background of the Related Art

Generally, the ATM method divides user information into packets of a particular size, inserts destination information into header parts of packets, transfers packets in the form of cells of a fixed size, and restores original information from communicated packets. The ATM switching system provides a header address value, among the destination information, to a user terminal. The header address value is attached to the front of the user information, before transmission. Thus, the switching system may easily recognize the user information, convert it into cell unit packets, and then transfer them to the next destination.

The overall structure of such an ATM switching system is illustrated in FIG. 1. The ATM switching system is composed of a plurality of input modules (11) that process the input of user cells, a plurality of output modules (14) that process the output of user cells, a control module (13) that controls signal processing or call processing, etc., and a switch module (12) that performs switching into a relevant output module (14), by selecting the output path of cells according to path selection information attached to the front of the cell headers inputted from input module (11).

Input modules (11) and output modules (14) are subscriber boards, which physically access the subscriber lines.

Switch module (12) connects input modules (11) and output modules (14), which are the subscriber boards, through a plurality of switch fabric ports (hereinafter, "switch port") and performs switching between input modules (11) and output modules (14). According to the relevant related art, if a plurality of sub-ports with narrow bandwidths exist in one switch port, multicasting for the sub-ports is implemented by maintaining a sub-port multicast table and referring to the table using the connection ID. The connection ID is reserved at the local header of a cell that is transmitted transparently through the switch fabric.

As shown in FIG. 2, the related art sub-port multicasting of an ATM switching system operates as follows. The illustrated ATM switch system includes egress port cards (40) and ingress port cards (20), each having four sub-ports. Each sub-port is implemented with a 1 giga port device at the switch port of a switch fabric (30), which has 4 giga interfaces. In the related art sub-port multicasting method, a unique connection identifier is reserved in advance, at system level, and used for the purpose of the sub-port multicasting.

The multicasting for switch ports of the switch fabric (30) is performed by assigning a connection ID, for the ATM connection, to each switch port at the ingress port card (20) of the ATM switch system. Additionally, a virtual connection parameter table is stored and maintained in memory that has the connection IDs and fan-out port information, so that the multicast fan-out port information may be referred to through a connection ID. That is, multicasting is performed using the fan-out port information inserted into the local headers of multicast cells.

The structure of the multicast cell is illustrated in FIG. 3. In FIG. 3, the fan-out switch port information is the information in the 'PortBitMap' field and the connection ID is the information in the 'Connection ID[15:8][7:0]' field.

The virtual connection parameter table for switch-port multicasting, as shown in FIG. 4, includes the Connection ID field, which is assigned to each switch port for ATM Virtual Channel (VC) connection, and the PBM field (PBM [7:0] ~PBM [31:24]), which sets forth fan-out switch port information. The fan-out switch port information indicates the egress port that is to perform the switch-port multicasting, using the connection ID in the bitmap format. If the connection ID indicates a unicast cell, 1-bit fan-out switch port information for the unicast cell output is set at the PBM field. If the connection ID indicates a multicast cell, fan-out switch port information of 1 or more bits is set at the PBM field.

Also, for multicasting to sub-ports, the egress port card (40) shown in FIG. 2 must store and maintain in memory the sub-port multicast table (41), which has the same number of entries as the number of connection IDs that are reserved, as illustrated in FIG. 5. If a cell transmitted transparently to the switch fabric (30) is a multicast cell, the ATM switching system refers to the sub-port multicast table (41), using the connection ID included in the local header of the relevant cell. Then, the ATM switching system copies the cell for each of the fan-out sub-ports, according to the result of the reference to the table, and outputs the copied cells to relevant subscribers through a multiplexer (42).

In other words, in a sub-port multicasting ATM switching system of the related art, not only is a virtual connection parameter table used for switch port multicasting at the side of the ingress port card (20), but also a separate sub-port multicast table (41) is used at the egress port card (40). For each switch port, a sub-port multicast table (41) is maintained by reserving in advance a restricted number of connection IDs, for the purpose of the multicast connection.

For the sub-port multicasting operation in an ATM switching system of the related art, the ingress port card (20) assigns connection IDs for the pre-reserved multicast area, at the time the multicast connection is set-up, and then sets the virtual connection parameter table and the sub-port multicast table (41) for each fan-out switch port in accordance with the relevant connection ID.

Thereafter, when a cell is inputted into the port device where a virtual connection parameter table is located, the connection ID is retrieved using the value of the Virtual Path Identifier (VPI)/Virtual Channel Identifier (VCI) and the Multiple Physical Device (MPHY) information inserted in the header of the relevant cell. Then, the cell is checked to determine whether it is a multicast cell.

If it is determined that the cell is a multicast cell (in other words, if a cell having an associated connection ID assigned for multicasting is inputted), the fan-out switch port information is recorded in the bitmap format at the local header of the relevant cell and the multicast indicating field is set to indicate that the relevant cell is a multicast cell. Then, the cell is transmitted to the egress port card (40) through the switch fabric (30).

Thereupon, the egress port card (40) extracts the connection IDs and the multicast indicating field from the local header of the cell transmitted through the switch fabric (30). Then, the egress port card (40) obtains the fan-out sub-port information for multicasting, by referring to the sub-port multicast table (41), using the extracted connection ID as an index. Then, cells are copied and outputted for the relevant fan-out sub-ports using the fan-out sub-port information extracted from the relevant sub-port multicast table (41).

Recently, as the amount of high-quantity multimedia information increases, the capacities of switches and switch ports that handle the large amount of multimedia information become larger. According to the increase of the capacity of the switch port, the number of sub-ports increases, and thus it is made possible to match multiple subscriber boards to one switch port.

Also, the demand of multicast connection increases as the use of teleconference and Video On Demand (VOD) services increases. Under this network environment, the ATM switching system of the related art has a problem in that the number of connections available for multicasting is limited, because multicast connection IDs corresponding to sub-ports at the side of the egress ports should be reserved in advance for the multicasting connection. Moreover, the sub-port multicast table, which has as many entries as the maximum number of reserved sub-port multicast connections, should be stored and maintained for every egress port, which causes significant hardware overhead in the given system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is, therefore, an object of the present invention to provide sub-port multicasting.

It is another object of the present invention to transmit fan-out port information, r of sub-ports connected to the switch port, through the local header of the input cell at the ingress port side of an ATM switching system.

It is a further object of the invention to extract fan-out sub-port information, of the relevant cell, at the egress port side using the switch port number.

It is a further object of the present invention to eliminate the limitation on the number of connections for sub-port multicasting.

It is a further object of the invention to eliminate the related art restriction caused by reserving connection IDs for supporting multicasting.

It is a further object of the invention to perform multicasting for sub-ports using the switch port number connected to the egress port.

It is a further object of the invention to eliminate the cause of hardware overhead by removing the sub-port multicast table.

In order to achieve one or more of the above-mentioned objects, the present invention provides a method for sub-port multicasting in an ATM switching system, which includes inserting multicast fan-out port information for sub-ports of each switch port into a multicast cell at an ingress port card and transmitting it to an egress port card; and reading the multicast fan-out port information inserted in the multicast cell at the egress port card and performing multicasting for the sub-port corresponding to the multicast fan-out port information.

Preferably, the method includes storing and maintaining fan-out switch port information and fan-out sub-port information for the respective switch ports in a virtual connection parameter table at the time of setting up a multicast connection of the ATM switching system, which contains the ingress port card and the egress port card.

Preferably, the fan-out switch port information and fan-out sub-port information are assigned connection IDs for the respective switch ports and are stored in the virtual connection parameter table of the ingress port card.

Preferably, transmitting information to the egress port card includes checking whether an inputted cell is the multicast cell, when a cell is inputted into the ingress port card, and inserting the relevant multicast fan-out switch port information and fan-out port information, for the respective sub-ports, into the multicast cell and transmitting the multicast cell to the egress port card.

Preferably, the multicast fan-out port information is inserted into a local header of the multicast cell, in a bitmap format, and is transmitted to the egress port card.

Preferably, checking whether the inputted cell is the multicast cell includes searching and obtaining a connection ID, using VPI/VCI and MPHY information inserted in a header of the inputted cell, and then checking whether the inputted cell is the multicast cell.

Preferably, the multicast fan-out switch port information and fan-out port information for the respective sub-ports are obtained by referring to the virtual connection parameter table, using the connection ID given for each switch port, when the inputted cell is the multicast cell.

Preferably, transmitting the multicast cell to the egress port card is performed by inserting the fan-out switch port information and the fan-out port information, for the respective sub-ports of the multicast cell, into a local header in a bitmap format and then transmitting it to the egress port card through a switch fabric, by setting a multicast indicating field.

Preferably, performing multicasting for the sub-port includes checking whether a cell transmitted from the ingress port card is the multicast cell, by referring to a local header of the transmitted cell, and reading the fan-out port information inserted in the local header, if the transmitted cell is the multicast cell.

Preferably, checking whether the cell transmitted from the ingress port card is the multicast cell includes checking whether the transmitted cell is the multicast cell, by referring to a multicast indicating field of the local header of the transmitted cell.

Preferably, checking whether the cell transmitted from the ingress port card is the multicast cell includes checking whether the transmitted cell is the multicast cell, by referring to a sub-port multicast bitmap of the local header of the transmitted cell.

Preferably, the fan-out port information is read at the local header of the multicast cell, using the switch port number connected to the egress port card itself. Preferably, the switch port number is the number of the switch port to which the egress port card is connected.

In one embodiment of the present invention, a method for multicasting to sub-ports in an ATM switching system includes inserting multicast fan-out port information, for sub-ports of each switch port, into a multicast cell in a bitmap format at the ingress port card and transmitting it to an egress port card; and reading bitmap information inserted in the multicast cell at the egress port and performing multicasting for the sub-port corresponding to the bitmap information.

The objects of the invention may further be achieved in whole or in part by a method for multicasting in an Asynchronous Transfer Mode (ATM) switch, including putting fan-out switch port information and fan-out sub-port information in a local header of a multicast cell, communicating the multicast cell through an ATM switch fabric to an egress port card, and communicating the multicast cell to fan-out sub-ports in accordance with the fan-out switch port information and fan-out sub-port information associated with the multicast cell.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 illustrates the structure of a related art cell;

FIG. 4 illustrates a virtual connection parameter table, for the sub-port multicasting illustrated in FIG. 2, using the reservation of connection IDs;

FIG. 7 illustrates the virtual connection parameter table for the sub-port multicasting according to the present invention;

FIG. 8 illustrates the cell structure of the present invention; and

DETAILED DESCRIPTION OF PREFERRED EMBODIMENTS

Figure 1:
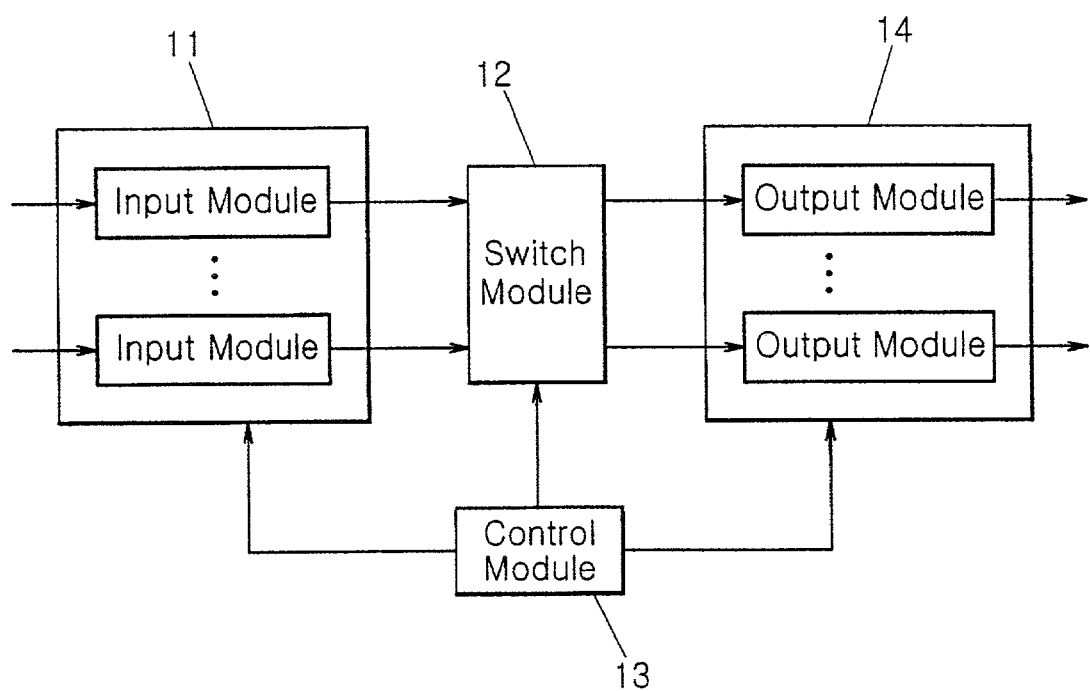
FIG. 1 illustrates a related art ATM switching system.

In an ATM switching system of the present invention, by inserting fan-out sub-port information corresponding to a connection ID into a local header of a cell for multicasting at an ingress port card, multicasting to sub-ports is conducted using the switch port number at the side of an egress port card. As illustrated in the sub-port multicasting structure of an ATM switching system shown in FIG. 6, the ATM switching system is comprised of an ingress port card (50), a switch fabric (60) and an egress port card (70).

The ingress port card (50) references a virtual connection parameter table (not shown in the drawings), using the connection ID, to obtain fan-out switch port information of a multicast cell and fan-out port information for each sub-port connected to each switch port. This information is inserted into a local header of the cell in a bitmap format. Upon setting a multicast indicating field of the relevant cell, ingress port card (50) transmits the cell to the egress port card (70) through the switch fabric (60).

If the cell transmitted through the switch fabric (60) is determined to be a multicast cell, upon referring to the multicast indicating field in the local header of the transmitted cell, the egress port card (70) reads the fan-out sub-port information in the local header of the cell using the number of the switch port to which it is connected. Then, egress port card (70) copies and outputs cells for the relevant fan-out sub-ports.

As shown in FIG. 7, the virtual connection parameter table of the present invention includes a field for the connection ID assigned for each switch field, for the ATM VC connection; a PBM field (PBM[7:0]~PBM[31:24]) indicating the fan-out switch port information, in the bitmap format; and an SBM field (SBM[3:0]~SBM[127:124]) indicating the fan-out sub-port information, which is the output sub-port information for the sub-port multicasting in the bitmap format. For multicast cell processing, the fan-out sub-port information of at least 1 bit is set in the SBM field, for the output of the multicast cell.

Figure 2:
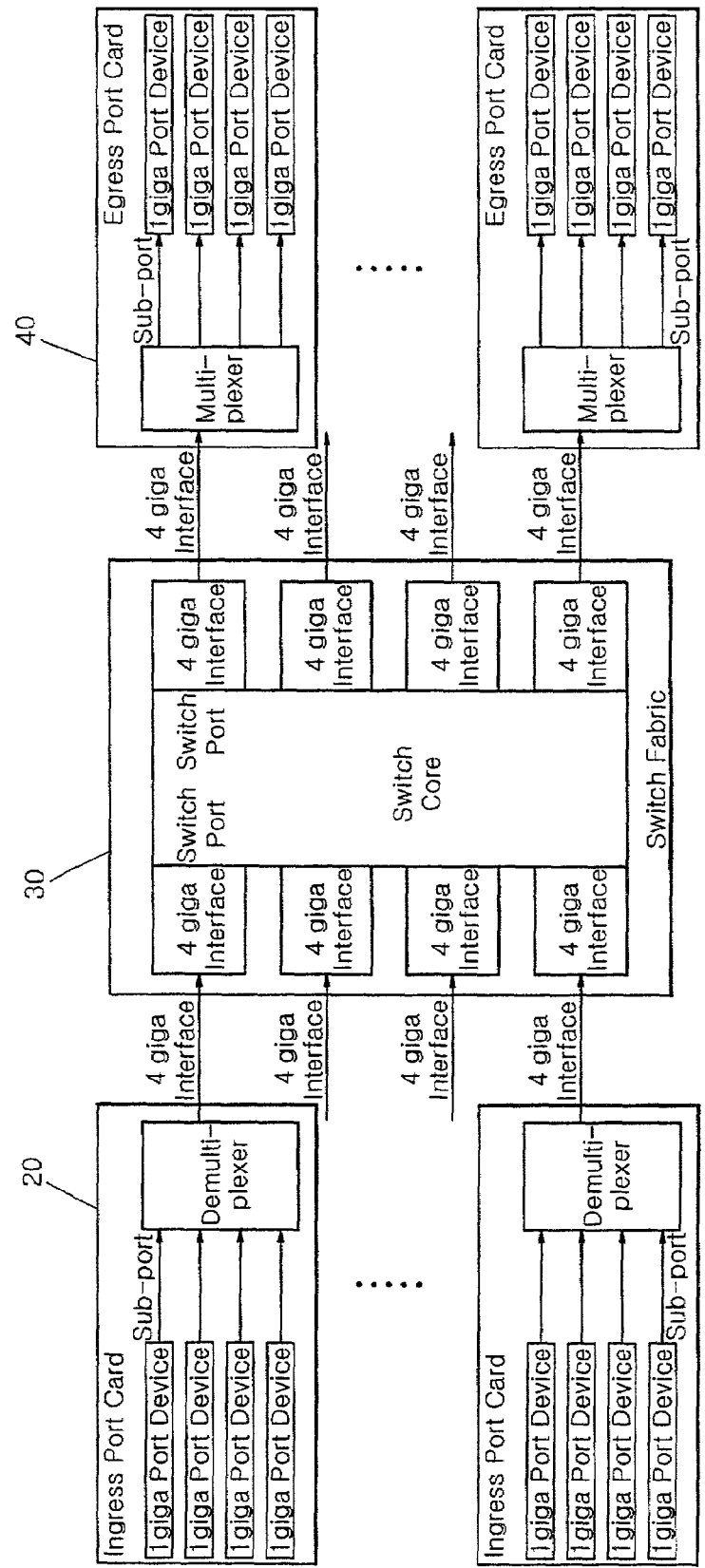
FIG. 2 illustrates the sub-port multicasting in a case where four sub-ports are connected to each switch port, in an ATM switching system of the related art.
Figure 5:
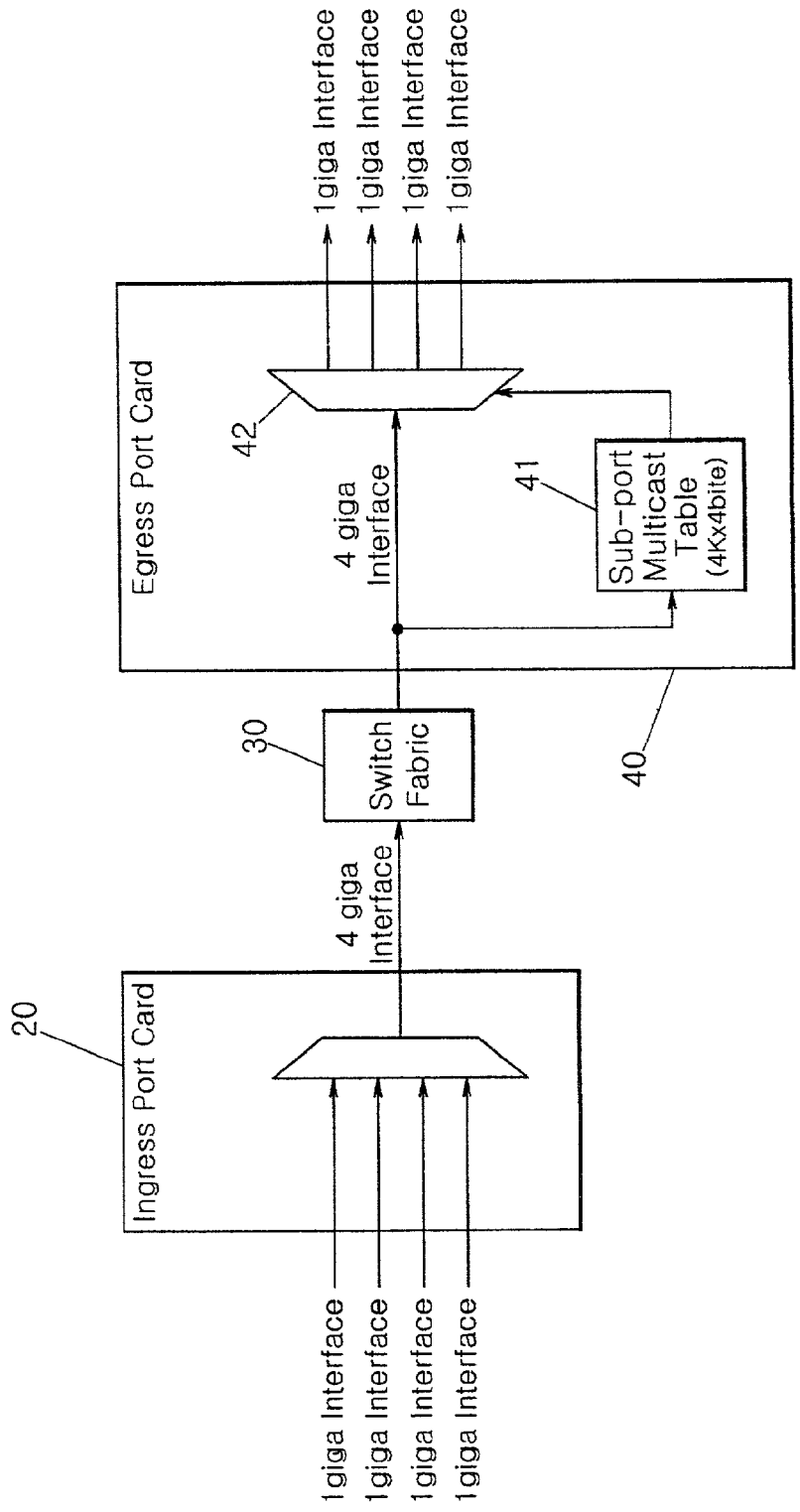
FIG. 5 illustrates the sub-port multicasting, making use of the related art sub-port multicast table.

The cell structure for the sub-port multicasting is as illustrated in FIG. 8. Compared with the cell structure of the related art, illustrated in FIG. 2, the cell according to the present invention further includes the SBM field (Subport Bit Map[0:7]~Subport Bit Map[120:127]), in which the fan-out sub-port information for the multicast cell processing is recorded in the bitmap format.

Figure 9:
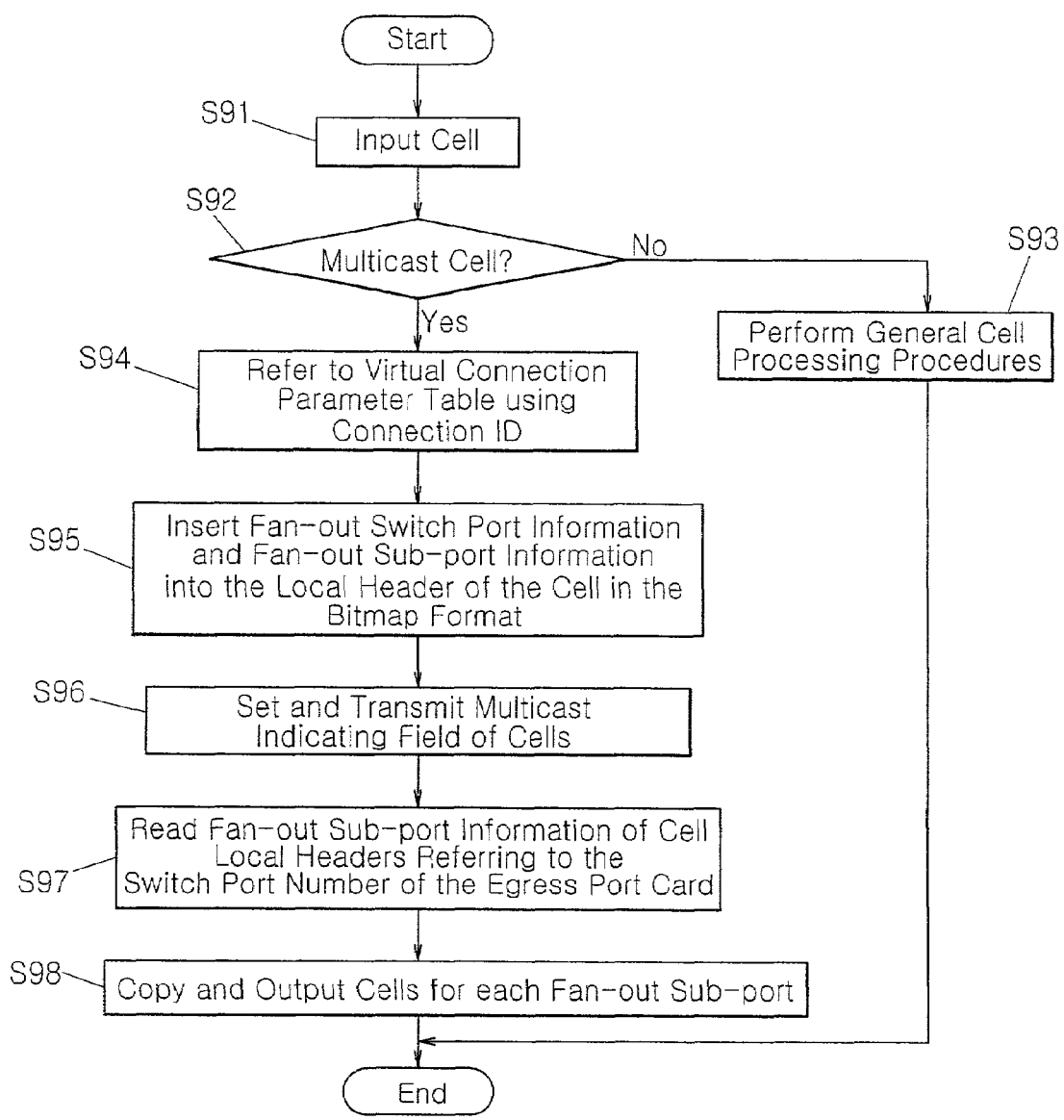
FIG. 9 illustrates the sub-port multicasting method in an ATM switching system, according to the present invention.

The sub-port multicasting operation of the above-described ATM switching system, according to the present invention, is illustrated by FIG. 9. At the time of the multicast connection setup of the ATM switching system, the multicasting connection information for each switch port is assigned the connection ID, according to the related art method, and the virtual connection parameter table is stored and maintained in memory. For each switch port, the fan-out information for multicast sub-ports is stored in the virtual connection parameter table of the ingress port card (50).

When a cell is inputted, the ingress port card (50) obtains the connection ID, by referencing the virtual connection parameter table, using the VPI/VCI value and the MPHY information that is inserted in the header of the relevant cell, and determines whether the inputted cell is a multicast cell (S91, S92). If it is determined that the inputted cell is not a multicast cell, the cell is processed according to the general cell processing procedures (S93). If it is determined that the inputted cell is a multicast cell, the virtual connection parameter table is referenced, using the connection ID (S94).

The ingress port card (50) inserts into the local header of the cell, in the bitmap format, the fan-out switch port information and the fan-out sub-port information of the multicast cell, which has been obtained by referring to the virtual connection parameter table (S95). Then, ingress port card (50) transmits the multicast cell through the switch fabric (60), after setting the multicast indicating field of the relevant multicast cell (S96).

The egress port card (70), which has received the cell through the switch fabric (60), determines whether the inputted cell is a multicast cell, by referring to the multicast indicating field in the local header of the multicast cell. If the inputted cell is determined to be a multicast cell, the egress port card (70) reads the fan-out port information of the sub-ports, inserted in the local header of the multicast cell, by referring to the corresponding switch port number connected to the egress port card (70) (S97). Then, through copying cells for the relevant fan-out sub-ports and outputting them through the multiplexer (71) (S98), the multicasting for sub-ports is conducted.

Figure 6:
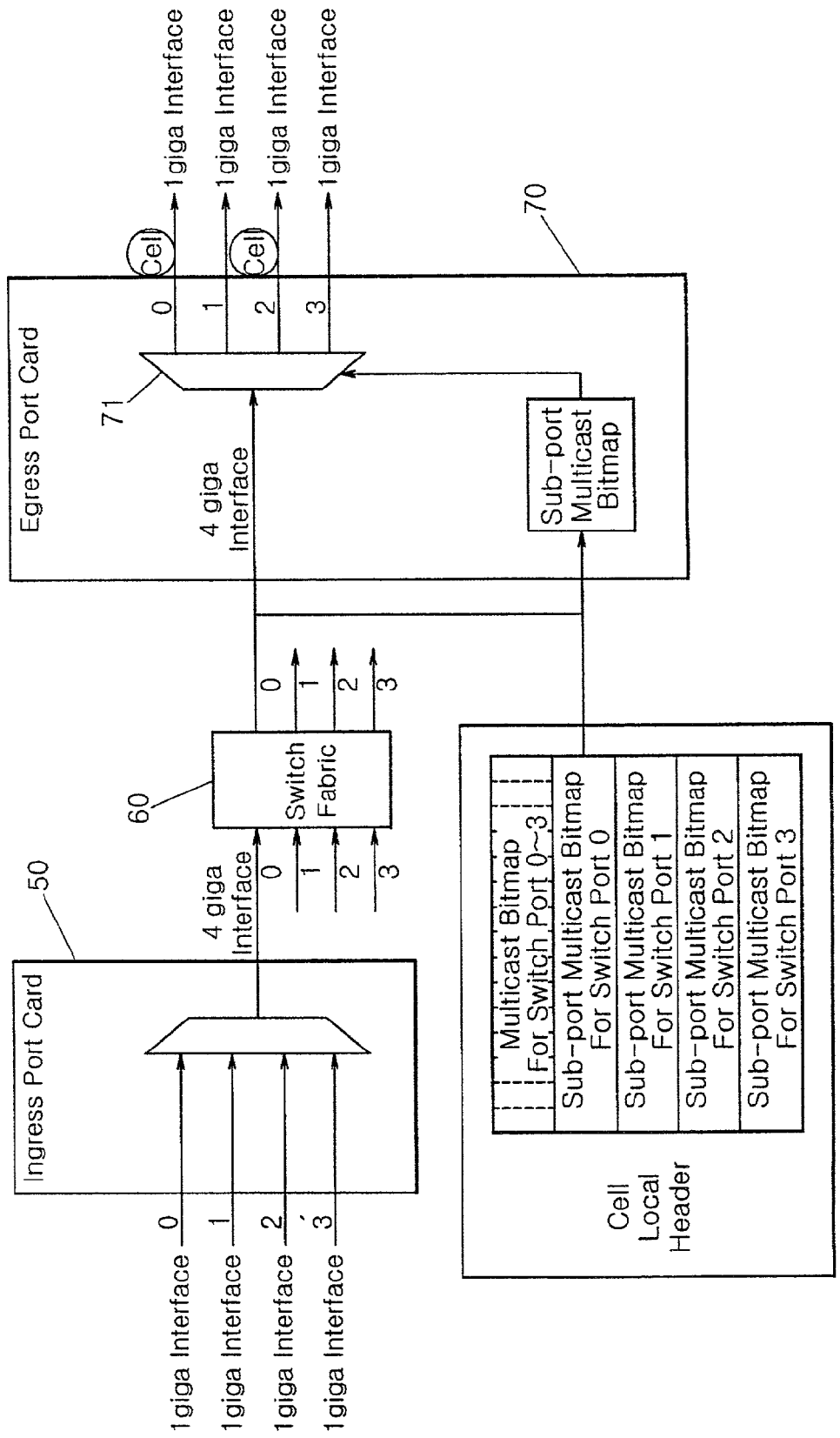
FIG. 6 illustrates the composition of the sub-port multicasting in an ATM switching system, according to the present invention.

In other words, in the example shown in FIG. 6, the multicast cell that is inputted into the egress port card (70) connected to switch port '0' of the switch fabric (60) is multicast to sub-ports '0' and '2' of the egress port card (70), by reading the local cell header field of the 'sub-port multicast bitmap for switch port 0'.

As explained above, each egress port card in the ATM switching system of the present invention checks whether the inputted cell is a multicast cell, by referring to the multicast indicating field in the local header of the inputted cell. If the inputted cell is a multicast cell, the multicasting for the relevant sub-ports is conducted by extracting the fan-out port information for the sub-ports inserted in the local header of the inputted cell, using the switch port number connected to the egress port. Thus, the connection ID is not used for the sub-port multicasting and, accordingly, it is not necessary to reserve the connection ID for the purpose of sub-port multicasting. Furthermore, there is no longer a limitation on the number of connections for the sub-port multicasting, which is limited in the related art by the connection ID. Moreover, it is not necessary for the egress port card to refer to the sub-port multicast table using the connection ID. Thus, it is not necessary to store and maintain the sub-port multicast table in memory. Therefore, the related art hardware overhead may be eliminated.

As explained above, according to the present invention, the sub-port multicasting may be conducted by inserting the fan-out port information, of the sub-ports connected to the switch port, into the local header of the inputted cell; transmitting the cell at the ingress port side of the ATM switching system; and extracting the fan-out sub-port information of the relevant cell using the number of the switch port connected to the egress port, at the side of the egress port.

Moreover, because the connection limitation or hardware overhead for the sub-port multicasting is eliminated in the ATM switching system of the present invention, the switching network environment, which requires high capacity of each unit switch port, owing to the high capacity of switches, increased number of sub-ports, and various multicast applications, such as the teleconference or VOD services, may effectively be supported.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for sub-port multicasting in an Asynchronous Transfer Mode (ATM) switching system, comprising:
   providing multicast fan-out port information for sub-ports of each of a plurality of switch ports into a multicast cell at an ingress port card, wherein the providing includes:
      determining that a cell received at the ingress port card is the multicast cell,
      obtaining a connection identifier (ID) corresponding to the cell received by the ingress post card using Virtual Path Identifier (VPI)/Virtual Channel Identifier (VCI) information and multiple physical device (MPHY) information associated with the received cell,
      obtaining the fan-out switch port information and the fan-out sub-port information by referencing the connection ID in a virtual connection parameter table of the ingress port card, and
      providing the multicast fan-out sub-port information into a local header of the multicast cell in a bitmap format while the cell is at the ingress port card;
   transmitting the multicast cell having the multicast fan-out sub-port information from the ingress port card to an egress port card;
   reading the multicast fan-out port information from the multicast cell at the egress port card; and
   performing multicasting for the sub-ports corresponding to the multicast fan-out port information using a corresponding switch port number connected to the egress port card and without using an egress translation table.

2. The method of claim 1, further comprising:
   storing the multicast fan-out port information and the multicast fan-out sub-port information, for the respective switch ports, in the virtual connection parameter table of the ingress port card, at a time of setting up a multicast connection within the ATM switching system containing the ingress port card and the egress port card.

3. The method of claim 2, wherein the multicast fan-out port information and the multicast fan-out sub-port information are assigned connection Identifiers (IDs) for the respective switch ports and are stored in the virtual connection parameter table of the ingress port card.

4. The method of claim 1, wherein the multicast fan-out port information is inserted into the local header of the multicast cell, in the bitmap format, and is transmitted to the egress port card.

5. The method of claim 1, wherein determining that the received cell is the multicast cell comprises:
   obtaining the connection Identifier (ID) using the Virtual Path Identifier (VPI)/Virtual Channel Identifier (VCI) and the Multiple Physical Device (MPHY) information inserted in the header of the received cell; and
   checking whether the inputted cell is the multicast cell.

6. The method of claim 1, wherein the multicast fan-out port information and the multicast fan-out sub-port information for the respective sub-ports is obtained by referring to the virtual connection parameter table in the ingress port card, using a connection ID given for each switch port.

7. The method of claim 1, wherein transmitting the multicast cell to the egress port card comprises:
   transmitting the multicast cell to the egress port card through a switch fabric, by setting a multicast indicating field.

8. The method of claim 1, wherein performing multicasting for the sub-ports comprises:
   determining whether a cell transmitted from the ingress port card is the multicast cell, by referring to a local header of the transmitted cell; and
   performing multicasting for the relevant sub-port by reading the fan-out port information inserted in the local header, if the transmitted cell is the multicast cell.

9. The method of claim 8, wherein determining whether the cell transmitted from the ingress port card is the multicast cell comprises checking whether the transmitted cell is the multicast cell, by referring to a multicast indicating field of the local header of the transmitted cell.

10. The method of claim 8, wherein determining whether the cell transmitted from the ingress port card is the multicast cell comprises checking whether the transmitted cell is the multicast cell, by referring to a sub-port multicast bitmap of the local header of the transmitted cell.

11. The method of claim 8, wherein the multicast fan-out port information is read from the local header of the multicast cell, by reference to a switch port number connected to the egress port card.

12. The method of claim 11, wherein the switch port number is a number of the switch port to which the egress port card is connected.

13. The method of claim 8, wherein performing multicasting for the sub-ports comprises copying and outputting cells for fan-out sub-ports identified by the local header of the multicast cell.

14. A method for multicasting to sub-ports in an Asynchronous Transfer Mode (ATM) switching system, comprising:
   providing multicast fan-out port information for sub-ports of each of a plurality of switch ports into a multicast cell, using a bitmap format, at an ingress port card, wherein the providing includes:
      obtaining a connection identifier (ID) corresponding to a cell received by the ingress port card using Virtual Path Identifier (VPI)/Virtual Channel Identifier (VCI)

information and multiple physical device (MPHY) Information associated with the received cell, obtaining the fan-out switch port information and the fan-out sub-port information by referencing the connection ID in a virtual connection parameter table of the ingress port card, and providing the multicast fan-out sub-port information into a header of the multicast cell in the bitmap format, transmitting the multicast cell having the multicast fan-out sub-port information in the header of the cell from the ingress port card to an egress port card;

reading the bitmap multicast fan-out port information in the multicast cell at the egress port card, wherein the multicast fan-out port information is read from the header of the multicast cell by referencing a switch port number connected to the egress port card, and wherein the switch port number is a switch port number of a switch fabric to which the egress port card is connected; and performing multicasting for the sub-port corresponding to the bitmap information using the switch port number connected to the egress port card and without using an egress translation table.

15. A method for multicasting in an Asynchronous Transfer Mode (ATM) switch, comprising:

providing fan-out switch port information and fan-out sub-port information in a local header of a multicast cell at an ingress port card, wherein the fan-out switch port information and the fan-out sub-port information are obtained from a virtual connection parameter table of the ingress port card, by reference to an associated connection identifier (ID), the fan-out sub-ports being output ports of egress port cards, and wherein the fan-out switch port information and the fan-out sub-port information are obtained by:

obtaining a connection identifier (ID) corresponding to the cell received by the ingress port card using virtual Path Identifier(VPI)/Virtual Channel Identifier (VCI) information and multiple physical device(MPHY) information associated with the received cell, and obtaining the fan-out switch port information and the fan-out sub-port information by referencing the connection ID in the virtual connection parameter table of the ingress port card;

communicating the multicast cell having the fan-out switch port information and the fan-out sub-port information in the local header from the ingress port card through an ATM switch fabric to at least one of the egress port cards; and communicating the multicast cell to fan-out sub-ports of the at least one egress port cards in accordance with the fan-out switch port information and the fan-out sub-port information associated with the multicast cell using a corresponding switch port number connected to the at least one egress port card and without using an egress translation table.

16. The method of claim 15, wherein the fan-out switch port information and the fan-out sub-port information are provided in the local header of the multicast cell using a bitmap format.

17. The method of claim 15, further comprising setting a multicast indicating field value of the multicast cell to indicate a multicast mode, before communicating the multicast cell through the ATM switch fabric.

18. The method of claim 15, further comprising:
determining whether the received cell is a multicast cell; and
obtaining the fan-out switch port information and the fan-out sub-port information only if the received cell is a multicast cell.

19. The method of claim 15, further comprising determining, with the egress port card, whether a received cell is the multicast cell based on the value of a multicast indicating field within a local header of the received cell.

20. The method of claim 15, further comprising:
obtaining, with the egress port card, the fan-out switch port information and the fan-out sub-port information associated with the multicast cell.

21. The method of claim 20, wherein the egress port obtains the fan-out switch port information and the fan-out sub-port information from the local header using a switch port number.

22. The method of claim 21, wherein the switch port number identifies the switch port of the switch fabric connected to the egress port card and is used to reference the local header.

23. An Asynchronous Transfer Mode (ATM) multicasting apparatus, comprising:

an ingress port card that provides fan-out switch port information and fan-out sub-port information in a local header of a multicast cell, wherein the ingress port and provides the fan-out switch port information and the fan-out sub-port information by:

obtaining a connection identifier (ID) corresponding to a cell received by the ingress port card using Virtual Path Identifier (VPI) Channel Identifier (VCI) information and multiple physical device (MPHY) information associated with the received cell, and obtaining the fan-out switch port information and the fan-out sub-port information by referencing the connection ID in a virtual connection parameter table of the ingress port card, an ATM switch fabric that communicates the multicast cell having the fan-out switch port information and the fan-out sub-port information in the local header of the cell from an origination port to a destination port; and an egress port card that communicates the multicast cell to fan-out sub-ports of egress port in accordance with the fan-out switch port information and the fan-out sub-port information provided in the multicast cell using a corresponding switch port number connected to the egress port card and without using an egress translation table, wherein the origination port corresponds to the ingress port card and the destination port corresponds to the egress port card.

* * * * *